United States Patent [19]
Steiner

[11] Patent Number: 5,442,787
[45] Date of Patent: Aug. 15, 1995

[54] BEAM MULTIPLYING COMPONENT

[75] Inventor: Ivan B. Steiner, Ridgewood, N.J.

[73] Assignee: AlliedSignal Inc., Morristownship, N.J.

[21] Appl. No.: 984,826

[22] Filed: Dec. 3, 1992

[51] Int. Cl.$^6$ ............................................ G02B 27/10
[52] U.S. Cl. ...................... 359/629; 359/638; 359/639; 359/601
[58] Field of Search .............. 359/629, 633, 636, 638, 359/640, 834, 857, 618, 861

[56] References Cited

U.S. PATENT DOCUMENTS

| 3,498,693 | 3/1970 | Fein et al. | 359/629 |
|---|---|---|---|
| 3,501,222 | 3/1970 | Herriott et al. | 359/629 |
| 3,501,223 | 3/1970 | Rack | 359/629 |
| 4,502,757 | 3/1985 | Maeda | 359/629 |
| 4,659,185 | 4/1987 | Aughton | 359/629 |
| 4,925,271 | 5/1990 | Tahiur | 359/629 |

FOREIGN PATENT DOCUMENTS

| 52-5540 | 1/1977 | Japan | 359/839 |
|---|---|---|---|
| 57-74722 | 5/1982 | Japan | 359/629 |
| 59-22022 | 7/1982 | Japan | 359/636 |
| 59-100410 | 6/1984 | Japan | 359/839 |
| 2145838 | 4/1985 | United Kingdom | 359/636 |

OTHER PUBLICATIONS

*IBM Tech Dis. Bull.*, vol. 28, No. 4, Sep. 1985 "Multiple Beams . . . ", pp. 1492–1495.
"Parylene Pellicles", Union Carbide publication, Aug. 1971.
"Beam Splitting with NPC Pellicles", National Photocolor publication, Oct. 1973.
"Beam Splitter/Combiner", Goddard Space Flight Center, NASA, Tech. Briffs, Summer, 1976, p. 186.

*Primary Examiner*—Jon W. Henry
*Attorney, Agent, or Firm*—Donald B. Paschburg; Howard G. Massung

[57] ABSTRACT

An optical component consists of two or more plane-parallel windows with, respectively, two or more partially reflective surfaces. Each partially reflective surface splits off part of an original beam and produces another redirected beam. The redirected beam undergoes further redirection and attenuation by multiple reflections. Each even-numbered reflection produces a beam deviated from the original's beam direction by an even multiple of the angle between the windows. Thus, for a pair of windows a series of beams are produced that are in a straight line and are equally spaced.

6 Claims, 3 Drawing Sheets

BEAM MULTIPLYING COMPONENT

BACKGROUND OF THE INVENTION

1. Field of the Invention

The present invention relates to optical devices and more particularly to an optical device that, when inserted into a collimated beam of light, generates an array or a line of multiple collimated beams.

2. Description of the Prior Art

Conventional methods of generating multiple beams include either building a bank of multiple single beam generators or building a multiple beam generator with multiple pinhole sources in its focal plane. Both of these methods are expensive to produce and are not very accurate. The second method requires an optical lens design that maintains image quality over a field-of-view large enough to accommodate multiple pinhole sources. Because of the above, there is a requirement to provide a system that requires only on-axis image quality in the single beam source.

SUMMARY OF THE INVENTION

The present invention is a self-contained optical component consisting of two or more plane-parallel windows with, respectively, two or more partially reflective surfaces. When a collimated beam is projected into this device, each partially reflective surface splits off part of the beam to produce another redirected beam. The original beam, though attenuated by the partially reflecting surfaces, passes through the window(s) undeviated from its original direction. The redirected beam undergoes further redirection and attenuation by multiple reflections by partially reflecting surfaces of the window. Each even-numbered reflection produces a collimated beam deviated from the original beam's direction by an even multiple of the angle between the windows. Thus, for a pair of windows, a series of beams are produced that are in a straight line and are equally spaced. Alternatively, a single window having flat, non-parallel, partially reflecting faces multiplies a monochromatic collimated beam in a similar manner.

DETAILED DESCRIPTION OF THE INVENTION

Field-of-view mapping with a single beam, apart from being time intensive owing to large number of data points needed, is inherently less accurate than that performed with a multiple beam. Short and long-term drift in the beam simulator optical axis reduces the mapping accuracy from point to point and from array to array as the time required to map the field of view is increased. The beam multiplying component of the present invention improves mapping accuracy achieved by reducing mapping time and by using knowledge of the straightness and the precisely equal spacing inherently present in the line of beams produced by this device.

Figure 1:
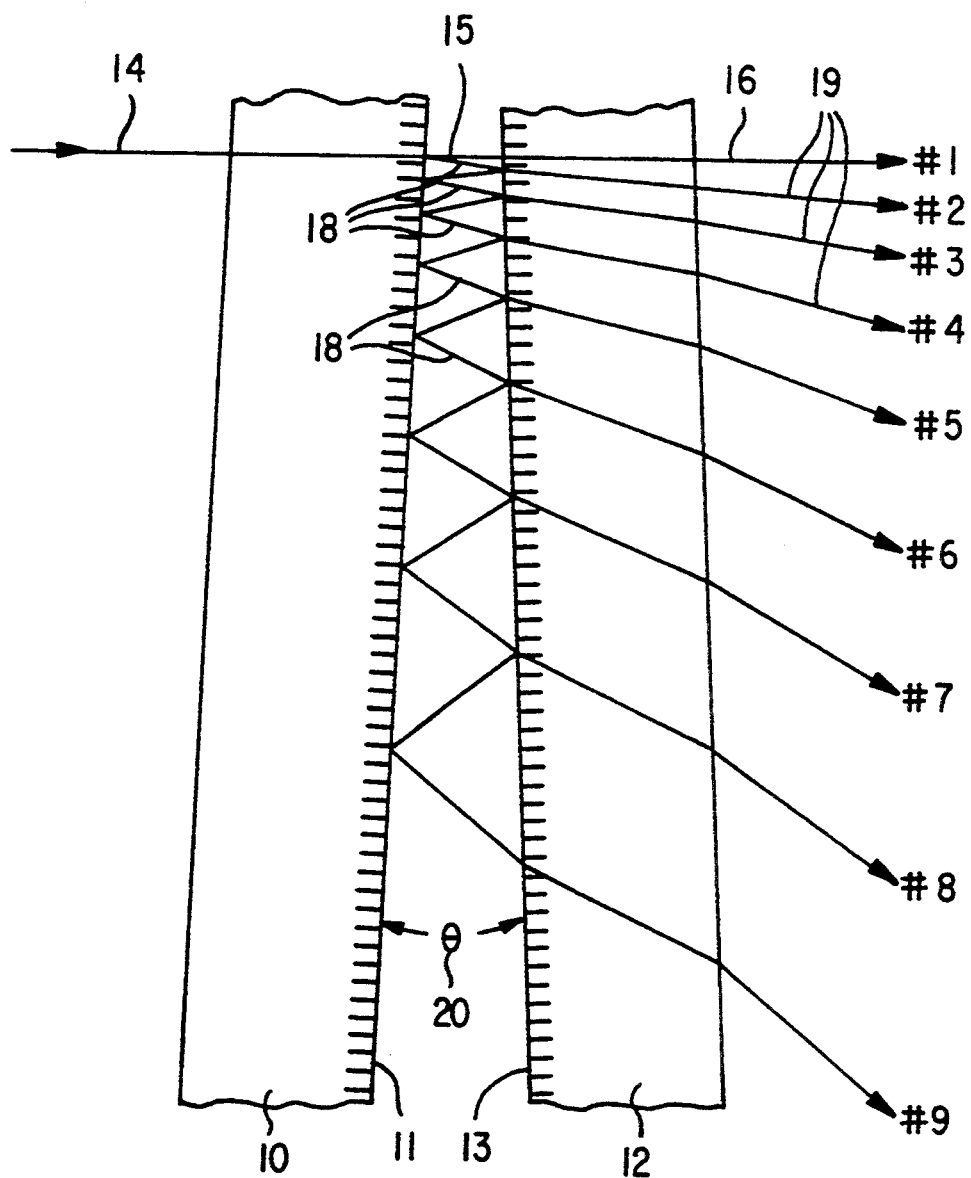
FIG. 1 illustrates one embodiment of the present invention.

As stated above, the present invention is a self-contained optical component consisting of two or more plane-parallel windows or pellicles with, respectively, two or more partially reflective surfaces. FIG. 1 illustrates one embodiment of the present invention having two plane-parallel windows 10, 12 with two partially reflective surfaces 11, 13. When collimated beam 14 is projected into this device, each partially reflective surface 11, 13 splits off part of beam 14 to produce redirected beam 15. The original beam 14, though attenuated by partially reflective surfaces 11, 13, passes through windows 10, 12 undeviated from its original direction. This is illustrated as undeviated beam 16. Redirected beam 15 will undergo further redirection and attenuation by multiple reflections by partially reflective surfaces 11, 13 of windows 10, 12. As shown in FIG. 1, each even-numbered reflection 18 produces a collimated beam 19 deviated from the original beam's direction by an even multiple of the angle 20 between the windows.

Thus, for a pair of windows, as shown in FIG. 1, a series of beams 19 is produced. The directions of propagation of these beams lie in a plane and the angular separation of adjacent beams is a constant equal to $2\theta$, where $\theta$ is the angle between windows.

The following example describes how the attenuation of the input (mother) beam and the brightness of the successive daughter beams are related to the transmittance $\tau$ of each window and the reflectance $\rho$ of the partially mirrored surfaces.

A straight line of equally-spaced beams is generated by passing a single beam 14 through a pair of plane-parallel windows 10, 12 as shown in FIG. 1. In this embodiment, the two interior adjacent surfaces 11, 13 have a reflectance of 0.9 and the cavity that separates them forms a wedge angle of 0.125 degrees. As FIG. 1 shows, this wedge cavity produces a precise straight line of beams equally separated at 0.25 degrees. Thus, nine beams span 2.00 degrees. The beam multiplying component of the present invention can be rotated about the optical axis to rotate the wedge. The line of beams always stays in the plane of the wedge angle and can be rotated to form a small angle with any linear detector array at the focal plane of an optical system that intercepts the beams. The value of this angle depends upon the beam scan rate selected and is chosen to be slightly greater than the minimum required to produce adequate temporal separation of adjacent beam crossings of a linear detector array.

The flatness requirement for each of the two surfaces bounding the wedge cavity is twice the number of reflections, or thirty-two times the wavefront error allocation for the ninth beam. Thus, a 1/10 wave error allocation requires 1/320 wave surface flatness. This is within the state-of-the-art for etalons made of fused silica to be used in a thermally stable laminar flow environment.

The multiple beams generated become successively dimmer with each cavity reflection. Thus, the ninth (daughter) beam will be the dimmest beam. If, for example, signal-to-noise requirements mandate the magnitude of the ninth beam not exceed +3, then the magnitude (M) of the single (mother) beam before attenuation by the present invention may not exceed:

$$M = +3 + \text{Log}\,[(\tau)^{+5}\rho^{+5(N-1)}]$$

where $\tau$ is the transmittance of each of the plane-parallel windows, $\rho$ is the reflectance of each surface of the wedge cavity and N is the number of the beam. The value of $\tau$, the transmittance, incorporates the effects of reflection losses owing to the external window or pellicle faces and the internal window or pellicle faces, and the effects of absorption by the partially reflecting coating and by the window or pellicle refractive medium. When $\tau=0.1$, $\rho=0.9$ and N $=9$, the maximum value of M $= -3.83$ magnitude.

The beam magnitude delta (relative to the mother beam) for the first of the nine daughter beams is:

$$\Delta m = -5\text{Log}(\tau). \text{ For } \tau=0.1, \Delta m = +5$$

For each successive beam, the magnitude delta relative to the previous daughter beam is:

$$\Delta m = -5\text{Log}\rho. \text{ For } \rho=0.9, \Delta m = +0.2288$$

When, for example, the unattenuated single (mother) beam magnitude is $-4.0$, then the nine successive (daughter) beams have magnitudes of:

| Beam # | Magnitude |
| --- | --- |
| 1 | +1.00 |
| 2 | +1.23 |
| 3 | +1.46 |
| 4 | +1.69 |
| 5 | +1.92 |
| 6 | +2.14 |
| 7 | +2.37 |
| 8 | +2.60 |
| 9 | +2.83 |

It is inherent in the beam multiplying component of the embodiment illustrated in FIG. 1 to produce an absolutely straight line of absolutely equally-spaced (angularly) beams. These properties of straightness and spacing equality can be relied upon without calibration. Furthermore, calibration of the spacing angle can be performed with improved accuracy by using the knowledge of spacing equality. For example, if the angular separation of two beams can be calibrated to an accuracy of 0.5 arc seconds, then by dividing the measured separation of the 1st and 11th beams by 10, the equal spacing between beams is determined to an accuracy of 0.05 arc seconds.

The present invention is a space-efficient modular component that can be placed in front of any beam simulator or collimator. The plane of the multiple beams generated rotates with the roll orientation of this device about the collimator (or beam simulator) optical axis. The alignment of the beam multiplying component of the present invention about the other two orthogonal axes is non-critical. In another embodiment of the present invention, illustrated in FIG. 2, utilized for a monochromatic source and comprising a single wedge shaped window, the alignment of the beam multiplying component about the other two orthogonal axes is more critical.

Because only one-axis information is provided by a line of beams, the beam multiplying component may require rotation about the optical axis of an optical system to calibrate a two-dimensional field-of-view (FOV).

The calibration produces a line of multiple point source images that proceeds in only one direction from the primary beam. With the primary beam pointed at the center of the FOV, the line of images will extend from the center to one edge of the FOV. For beam images 0.25 degrees apart, the windows in FIG. 1 must be separated by 0.125 degrees.

Rotation of the calibrator about any axis normal to the optical axis has no effect on the spacing of the images. The image spacing depends only on the angle between windows.

Figure 3:
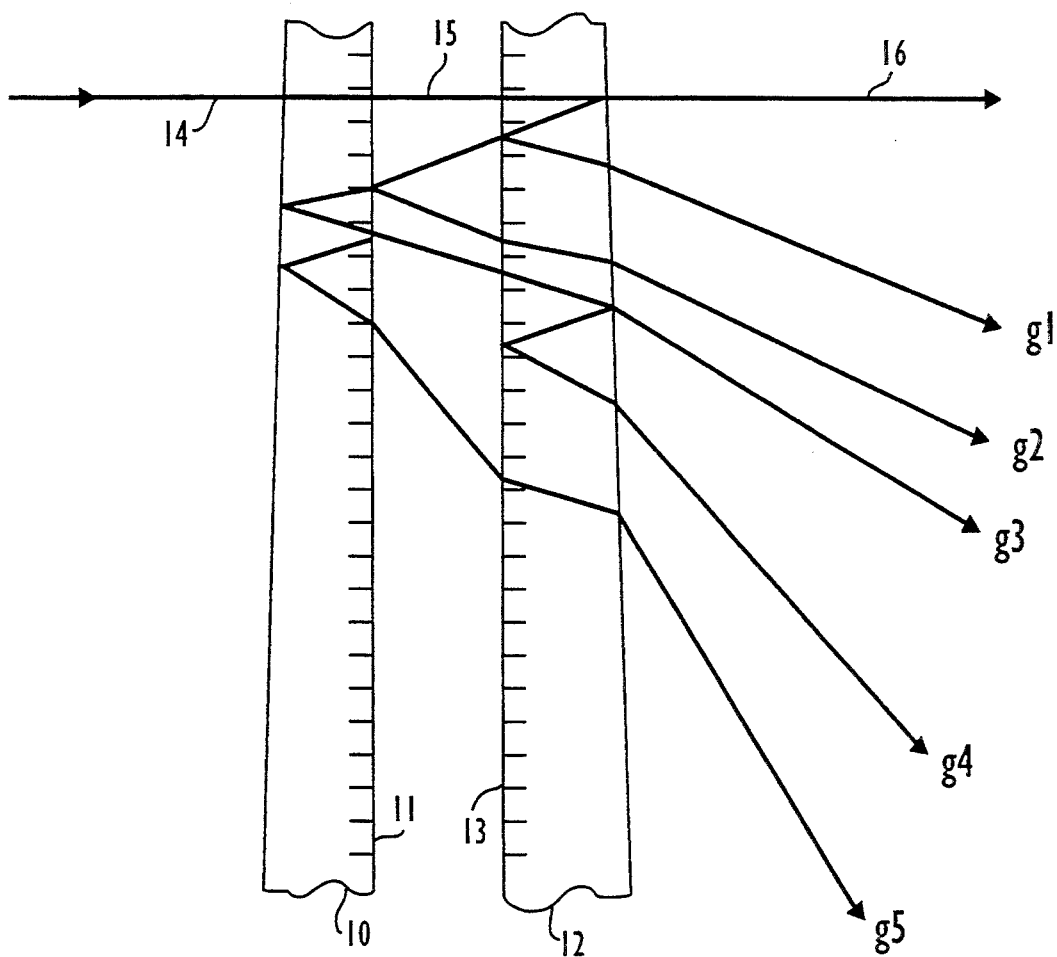
FIG. 3 is a view in a plane normal to FIG. 1 and illustrates the generation of unwanted ghost images.

In the preferred embodiment of FIG. 1, the mirrored faces will be adjacent to each other so that the refractive medium will not be traversed after each reflection. The remaining two faces are anti-reflection coated to reduce the intensity of unwanted ghost images. In addition, the wedge in each plate is oriented to be in a plane normal to the wedge between the mirrored faces such that multiple reflections from the outside faces will produce unwanted ghost images along lines normal to the line of test images. The ghost reflection geometry is illustrated in FIG. 3 wherein unwanted ghost rays are designated as g1, g2, g3, g4 and g5. To discriminate against unwanted ghost beam images, the wedge angle magnitude in each plate is large enough to insure that they occur at relatively large angular offsets from the calibration images.

In another embodiment of the present invention, that includes a third window (or pellicle) with a third partially reflecting surface, the one-dimensional line of parallel beams can be transformed into a two-dimensional array of beams. The geometry of this transformation is controlled by the magnitude and direction of the third window's angle relative to the first pair.

Figure 2:
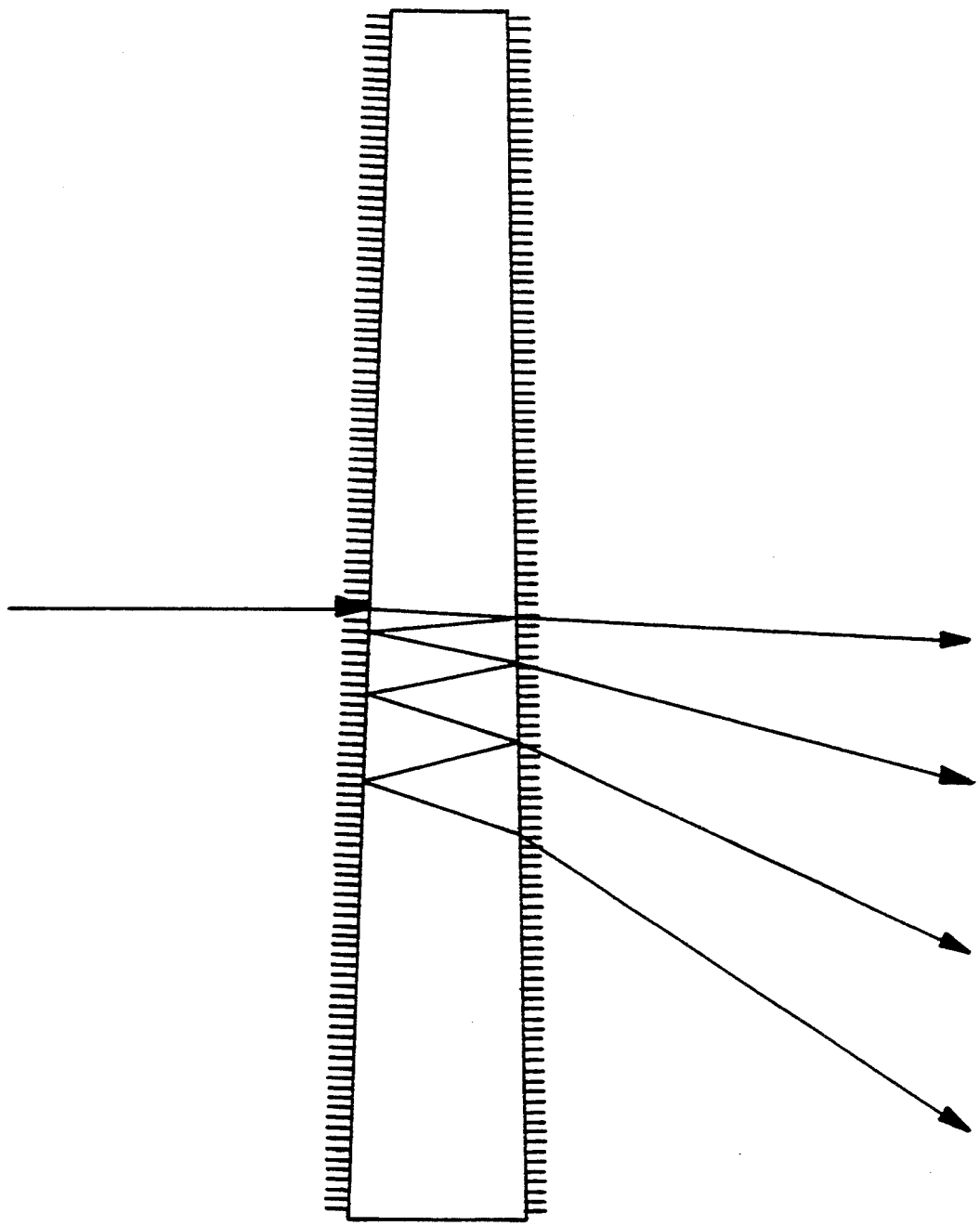
FIG. 2 illustrates another embodiment of the present invention.

In another embodiment illustrated in FIG. 2, the beam multiplying component of the present invention can be utilized with a monochromatic source. Such an embodiment includes a single window with partially reflecting plane faces separated by a wedge angle $\phi$, in which the refractive medium is traversed after each multiple reflection. Note that the angular deviation of adjacent beams of $2\theta$ applies only to plane-parallel windows separated by an angle of $\theta$. For a single wedged window with an angle of $\phi$ between its faces, adjacent beams emerging from the window are separated by approximately $(3n-1)\phi$, for small values of $\phi$ and where n is the refractive index of the window material. The spacing of adjacent beams is predictable but not absolutely uniform for this embodiment.

Because a wedge shaped window reacts like a prism, a broad spectral band source beam would be spectrally fragmented when it exits the window. This cannot occur if the source beam is monochromatic. Therefore, a pair of plane-parallel windows with internal partially reflecting faces is preferred for broadband sources while the simpler single wedge shaped window may be preferred for monochromatic sources.

The present invention can be used in the metric calibration of Star Trackers or Scanners. The focal plane of the optical systems in these instruments has detector arrays (of the linear or area type) or transparent slits (followed by an optical relay system leading to a PMT detector). The metric calibration performed using this invention maps the projection onto the celestial sphere of the sensitive focal plane areas (i.e. slits or detector pixels). Also, the orientation of this map relative to the coordinate system of the instrument mounting interface is determined.

In addition, the present invention can be used to perform the metric calibration of terrestrial or satellite-based topographic mapping cameras or of any other optical system that derives metric data from images in its focal plane.

It is not intended that this invention be limited to the hardware arrangement, or operational procedures shown disclosed. This invention includes all of the alterations and variations thereto as encompassed within the scope of the claims as follows.

I claim:

1. A beam multiplying component comprising:

a plurality of plane-parallel windows cooperatively arranged, each comprising an exterior surface and an interior adjacent surface, said interior adjacent surface having a partially reflective surface, wherein when an original beam is projected into said beam multiplying component each partially reflective surface splits off part of said original beam to produce a redirected beam;

said redirected beam undergoing further redirection and attenuation through multiple reflections by each partially reflective surface therefore producing a series of beams each of which is a straight line and wherein successive beams are separated by equal angles while the spacing of the beams varies and increases with each successive reflection;

angular separation between each of said plurality of plane-parallel windows being $\theta$ and angular spacing between adjacent beams of said series of beams being a constant equal to $2\theta$.

said series of beams including a plurality of even-numbered beams and a plurality of odd-numbered beams, each of said series of beams becoming successively dimmer with each of said multiple reflections.

each of said plurality of even-numbered beams being in a plane and deviating from the direction of said original beam by an even multiple of the angular separation between each of said plurality of plane-parallel windows;

said original beam passing through said plurality of plane-parallel windows attenuated but undeviated from the direction of said original beam; and said plurality of plane-parallel windows cooperatively arranged so that multiple reflections from said exterior surface will produce ghost images along lines normal to a test image line.

2. A beam multiplying component as claimed in claim 1 wherein each of said plurality of plane-parallel windows comprises pellicles.

3. A beam multiplying component as claimed in claim 1 further comprising:

said plurality of plane-parallel windows, cooperatively arranged, each comprising said exterior surface wherein said exterior surface is anti-reflection coated to reduce intensity of unwanted ghost images.

4. A beam multiplying component comprising:

a plurality of plane-parallel windows cooperatively arranged, each comprising an exterior surface and an interior adjacent surface, said interior adjacent surface having a partially reflective surface, wherein when an original beam is projected into said beam multiplying component each partially reflective surface splits off part of said original beam to produce a redirected beam;

said redirected beam undergoing further redirection and attenuation through multiple reflections by each partially reflective surface therefore producing a series of beams each of which is in a straight line and wherein successive beams are separated by equal angles while the spacing of the beam varies and increases with each successive reflection;

angular separation between each of said plurality of plane-parallel windows being $\theta$ and angular spacing between adjacent beams of said series of beams being a constant equal to $2\theta$;

said series of beams including a plurality of even-numbered beams and a plurality of odd-numbered beams, each of said series of beams becoming successively dimmer with each of said multiple reflections;

each of said plurality of even-numbered beams being in a plane and deviating from the direction of said original beam by an even multiple of the angular separation between each of said plurality of plane-parallel windows;

said original beam passing through said plurality of plane-parallel windows attenuated but undeviated from the direction of said original beam; and said plurality of plane-parallel windows cooperatively arranged so that angular separation between each of said plurality of plane-parallel windows ensures that ghost images occur at a large angular offset from calibration images.

5. A beam multiplying component as described in claim 4 wherein each of said plurality of plane parallel windows comprises pellicles.

6. A beam multiplying component as described by claim 4, further comprising:

said plurality of plane parallel windows cooperatively arranged, each comprising said exterior surface wherein said exterior surface is anti-reflection coated to reduce the intensity of unwanted ghost images.

* * * * *